(12) United States Patent
Tighe et al.

(10) Patent No.: US 7,073,751 B1
(45) Date of Patent: Jul. 11, 2006

(54) AIRCRAFT STRUCTURE FATIGUE ALLEVIATION

(75) Inventors: David J Tighe, Bristol (GB); Andrew D Williams, Bristol (GB)

(73) Assignee: AIRBUS UK Limited, Bristol (GB)

( * ) Notice: Subject to any disclaimer, the term of this patent is extended or adjusted under 35 U.S.C. 154(b) by 656 days.

(21) Appl. No.: 09/582,760

(22) PCT Filed: May 25, 2000

(86) PCT No.: PCT/GB00/01998

§ 371 (c)(1),
(2), (4) Date: Jun. 30, 2000

(87) PCT Pub. No.: WO00/75013

PCT Pub. Date: Dec. 14, 2000

(30) Foreign Application Priority Data

Jun. 5, 1999 (GB) ................................ 9913032.0

(51) Int. Cl.
*B64C 17/10* (2006.01)
(52) U.S. Cl. ................................. 244/135 C
(58) Field of Classification Search ............ 244/135 R, 244/135 C, 120
See application file for complete search history.

(56) References Cited

U.S. PATENT DOCUMENTS 2,585,480 A * 2/1952 Makhonine ............. 244/135 R
5,321,945 A * 6/1994 Bell ....................... 244/135 C
5,890,675 A   4/1999 Lacabanne et al.
5,975,464 A * 11/1999 Rutan ......................... 244/120

FOREIGN PATENT DOCUMENTS

GB          672914          5/1952

OTHER PUBLICATIONS

Ford, "On-Board Refuelling Systems Development", *Aircraft Engineering and Aerospace Technology*, vol. 68, No. 5, Jan. 1, 1996, pp. 15-20.

* cited by examiner

*Primary Examiner*—Galen Barefoot
(74) *Attorney, Agent, or Firm*—Nixon & Vanderhye P.C.

(57) ABSTRACT

A fuel transfer apparatus for an aircraft comprises:
two or more fuel tanks (2,3,4,5,6) arranged in an inboard to outboard alignment, at least one being situated in the wing (1) of the aircraft,
means for transferring fuel between the tanks (8, 9), and
a fuel management system (10) for controlling and monitoring the transfer of fuel between tanks
the fuel management system comprises;
means for receiving a first input signal that the aircraft has left the ground,
means for receiving a second input signal that the aircraft is approaching its destination,
means for initiating the transfer of the fuel from a relatively inboard tank location to a relatively outboard tank location in response to the first input signal, and
means for initiating the transfer of the fuel from a relatively outboard tank location to a relatively inboard tank location in response to the second input signal.

4 Claims, 1 Drawing Sheet

AIRCRAFT STRUCTURE FATIGUE ALLEVIATION

This application is the US national phase of international application PCT/GB00/01998, filed in English on May 25, 2000 which designated the US. PCT/GB00/01998 claims priority to GB Application No. 9913032.0 filed Jun. 5, 1999. The entire contents of these applications are incorporatd herein by reference.

BACKGROUND OF THE INVENTION

1. Field of the Invention

This invention relates to fatigue alleviation in aircraft during all phases of the ground-air-ground cycle (GAG).

2. Discussion of Prior Art

This invention relates to fatigue alleviation in aircraft during all phases of the ground-air-ground cycle (GAG).

Due to an increased demand for international air travel and in air traffic generally, there is a recognised need to increase the size and efficiency of both passenger and transporter aircraft. Customers also desire the capability to fly long distances at economical cost. As well as the physical size of the aircraft itself, the engineer has to consider the additional passenger and/or cargo weight to be carried by the craft and the quantity of fuel necessary to take the loaded craft safely to its destination.

A limiting factor in the design of such aircraft is the strength of the materials used, including those of the wing. For all commercial aircraft there are two fundamental design drivers which have to be met. Firstly there are the ultimate load cases; a once-only application of extremely high loading applied during abnormal conditions. There are a large number of these possible conditions and the aircraft is designed to withstand any which are foreseeable and then continue in safe flight and land safely. The aircraft may then be scrapped or require major repair. Secondly during all stages of the ground-air-ground (GAG) cycle, the wing is subjected cyclic loading conditions which cumulatively, over time, lead to the formation and then propagation of micro cracks and may ultimately appear as detectable cracks which require repair or maintenance to the aircraft. During cruise, the wings support the weight of the aircraft and bend upwards, whilst on the ground the wings are supported by the landing gear and possibly fuselage and thus bend downwards. The wings have to be designed to tolerate the damage caused by this cyclic loading to ensure structural integrity for the life of the aircraft. Today's technology allows accurate analysis of the large number of load cases that constitute the ultimate conditions; this allows the conservatisms of yesterdays designs to be reduced, leading to more economic aircraft to operate. The effect of this is that modern aircraft are increasingly defined by the cyclic loading conditions so it is evermore important to find ways to reduce the loading due to the GAG cycle. One approach is to find new ways of using the fuel weight to greater benefit.

Typically large aircraft are equipped with a number of fuel tanks positioned in their wings, the fuselage and tail area. Engine feed tanks are positioned near to the engines ensure a continuous supply of fuel to those engines, other tanks acts as reserves, storing fuel for transfer to the feed tanks as the feed tank supplies are burned. During flight, as the engine feed tanks begin to empty, a control system detects the reduction in fuel level and, once a predetermined level is recorded, causes fuel from the reserve tanks to be transferred to the feed tanks so that there is no interruption in the fuel supply to the engines.

The tankage is the total fuel capacity of the aircraft that is required for the aircraft to achieve its maximum payload range. However a typical flight is much shorter than the maximum so the available fuel tanks are not all filled. This allows a degree of flexibility regarding the positioning of fuel during the flight.

Conventionally, prior to take off, the outermost wing tank is full in anticipation of providing maximum wing bending relief once the aircraft has lifted-off. Unfortunately this also maximises damage to the wing during pre-flight taxiing and the take-off run. This invention seeks to alleviate this problem.

The present invention seeks to alleviate these problems and provide improved fatigue alleviation during the GAG cycle.

SUMMARY OF THE INVENTION

The present invention seeks to alleviate these problems and provide improved fatigue alleviation during the GAG cycle.

In accordance with the present invention there is provided a fuel transfer apparatus for an aircraft comprising:
  two or more fuel tanks arranged in an inboard to outboard alignment, at least one being situated in the wing of the aircraft,
  means for transferring fuel between the tanks, and
  a fuel management system for controlling and monitoring the transfer of fuel between tanks wherein the fuel management system comprises;
  means for receiving a first input signal that the aircraft has left the ground,
  means for receiving a second input signal that the aircraft is approaching its destination,
  means for initiating the transfer of the fuel from a relatively inboard tank location to a relatively outboard tank location in response to the first input signal, and
  means for initiating the transfer of the fuel from the relatively outboard tank location to a relatively inboard tank location in response to the second input signal.

This invention takes advantage of the fact that the aircraft is rarely fuelled for its maximum range to reduce the loading on the wing and centre section and hence their structure weight during the GAG cycle.

For a typical flight (which is likely to be only half the maximum range) the wing tanks will be filled from the root. This minimises wing damage during taxiing and the take-off run. Immediately the aircraft is airborne fuel will be then pumped outboard in the wing until it is as far outboard as possible leaving just the minimum fuel in the engine feed tanks. These feed tanks are continuously replenished during flight. As with current aircraft the outermost wing tanks will be emptied during descent, such that on landing these tanks are empty.

The optimum position for the fuel centre of gravity in an aircraft varies during the GAG cycle. During cruise, it is desirable to have the fuel centre of gravity as far outboard as possible to maximise wing bending relief for upward bending. At take-off and landing it is beneficial to have the fuel centre of gravity as far inboard as possible to minimise wing downward bending. Commonly, long range aircraft are operated below their maximum range capacity and therefore do not require all fuel tanks to be full at take off. This invention uses this fact to the advantage of the aircraft operator to minimise the effects of dynamic, cyclic loading caused by repeated GAG operation, consequently minimising downtime and maintenance costs and thus providing for more economical operation of the aircraft over a period of time.

By actively controlling the distribution of the fuel between the available tanks during the whole of the GAG cycle, the long term fatigue effect of the cyclic loading on the wings can be significantly reduced without the need to compensate by strengthening and reinforcing the wing structure with additional materials.

Benefits of this apparatus are particularly apparent in large, long range aircraft where wing structure weight savings of up to a tonne can be achieved providing a take-off weight saving of up to 2 tonnes per aircraft. It can be appreciated that by incorporating this apparatus, significant cost savings can be made both in manufacturing and operating costs for such aircraft.

In addition, less fuel may be needed for a given flight distance, reducing environmental pollution caused by bi-products of spent fuel.

Desirably the fuel management system is computerised and comprises a computer algorithm designed to respond to the various input signals and initiate the fuel transfer in the desired sequence. Optionally the computer algorithm can be specific to a particular flight path. A fuel management system may comprise a computer program which provides the flight crew with optional fuel management algorithms based on factors such as the flight path to be taken, the number of passengers and/or quantity of cargo to be carried, the overall quantity of fuel taken on board prior to departure, weather conditions, etc.

Conveniently, as means for responding to the first signal, the fuel management system can be programmed to respond to the signal conventionally sent to the flight control system of an aircraft when the gear wheels have left the ground to initiate retraction.

The fuel management system can be further programmed to respond to a second input signal that the aircraft has descended to a certain altitude on its approach to land. Alternatively a signal may be relayed between the flight control program and the fuel management system when a certain point on a pre-programmed flight path has been reached.

Desirably, the fuel management system will have manual override facility to enable flight crew to adapt to unforeseen circumstances.

Optionally during flight, the fuel management system may be programmed to transfer fuel between tanks in response to various stimuli, for instance a signal may be transmitted to the fuel management system to indicate increased or decreased activity of individual engines. As an additional safety feature, the fuel management system could be made to respond to detection of a leak in a particular tank, or unfavourable ambient conditions such as extremes of temperature which may affect the fuels properties.

The invention is further described, by way of example only, with reference to the drawing which illustrates a sample fuel tank layout for a large, long range passenger aircraft.

The drawing shows the distribution of tanks between the fuselage and one wing of an aircraft, the reader will appreciate that the principle can be extended to the second wing of the aircraft and that more or fewer tanks may be used, taking account of the size and fuel requirements of the aircraft in question. The wing (1) comprises 4 fuel tanks, an inner engine feed tank (2), an inner transfer tank (3), an outer engine feed tank (4) and an outer transfer tank (5). A further fuel tank, the centre tank (6) is located in the fuselage (7). Each of the tanks is connected to a fuel line (8) in which, between it and each tank, is located a two way valve (9). The fuel management system not shown co-ordinates the following fuel transfer operation during the GAG cycle.

BRIEF DESCRIPTION OF THE DRAWING

The invention is further described, by way of example only, with reference to the drawing which illustrates a sample fuel tank layout for a large, long range passenger aircraft.

DETAILED DISCUSSION OF PREFERRED EMBODIMENTS

Figure 1:
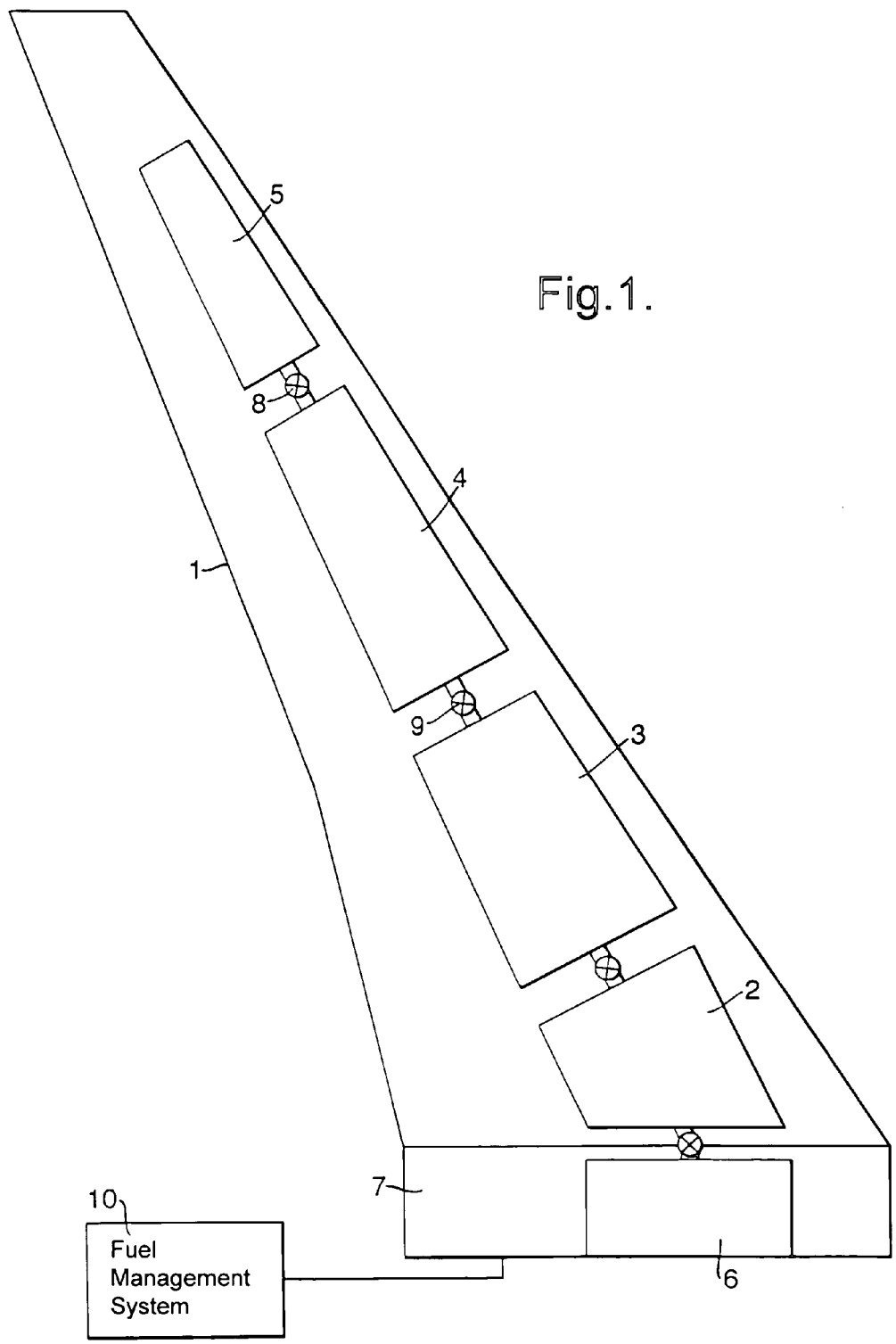

The drawing shows the distribution of tanks between the fuselage and one wing of an aircraft, the reader will appreciate that the principle can be extended to the second wing of the aircraft and that more or fewer tanks may be used, taking account of the size and fuel requirements of the aircraft in question. The wing (1) comprises 4 fuel tanks, an inner engine feed tank (2), an inner transfer tank (3), an outer engine feed tank (4) and an outer transfer tank (5). A further fuel tank, the centre tank (6) is located in the fuselage (7). Each of the tanks is connected to a fuel line (8) in which, between it and each tank, is located a two way valve (9). The fuel management system (10) coordinates the following fuel transfer operation during the GAG cycle.

Prior to taxi and in the run up to take off, each of the engine feed tanks (2, 4) retains a minimum safe level of fuel sufficient to operate the engines (not shown). Depending on the volume of fuel carried, the remaining fuel is pumped by the fuel management system into the centre tank (6) until this tank reaches its maximum capacity, remaining fuel is pumped to the inner feed tank (2) if that becomes full, the remainder is then pumped into the inner transfer tank (3) until that is full, and so on. Thus the fuel centre of gravity is retained as far inboard of the aircraft as possible.

On take-off, the wheels of the aircraft are retracted into the body of the plane. As the wheel retraction process begins, a signal is sent to the fuel management system which then initiates transfer of fuel between the tanks as follows:

Again a minimum safe level of fuel sufficient to operate the engines is retained in the engine feed tanks (2, 4). Fuel from the most inboard tanks (6, 2, 3) is carried through the fuel line (9) and transferred to the outer transfer tank (5) until it reaches its maximum capacity. Remaining fuel is transferred to the outer engine feed tank (4) until that tank reaches its maximum capacity. Any further remaining fuel is transferred or retained in the inner feed tank (2) and so on. Thus the fuel centre of gravity is repositioned to be as far outboard of the plane as possible.

During the flight, the fuel management system continuously feeds the engine feed tanks from the most inboard source to maintain a relatively outboard position of the fuel centre of gravity. As the aircraft approaches its destination and begins its descent towards the landing field, a signal is sent to the fuel management system which initiates a re-transfer of the remaining fuel back towards the centre tank (6) in the fuselage and the inner most wing tanks (2, 3).

The skilled reader will appreciate that it is not essential that any fuel be carried in or transferred to the fuselage or tail area of an aircraft and that the invention can be effectively applied to aircraft where all fuel storage is provided along the length of the wings.

The invention claimed is:

1. A fuel transfer apparatus for an aircraft comprising:
    at least two fuel tanks arranged in an inboard to outboard alignment, at least one tank being situated in a wing of the aircraft,
    at least one pump for transferring fuel between the tanks, and
    a fuel management system for controlling and monitoring the transfer of fuel between tanks, said system comprising:
        means for receiving a first input signal that the aircraft has left the ground;
        means for receiving a second input signal that the aircraft is approaching its destination,
        means for initiating the transfer of the fuel from a relatively inboard tank location to a relatively outboard tank location in response to the first input signal, and
    means for initiating the transfer of the fuel from a relatively outboard tank location to a relatively inboard tank location in response to the second input signal, wherein the fuel management system is computerised and comprises a computer algorithm designed to respond to the various input signals and initiate the fuel transfer in the desired sequence, wherein the computer algorithm is specific to a pre-programmed flight path for the aircraft.

2. A fuel transfer apparatus for an aircraft comprising:
    at least two fuel tanks arranged in an inboard to outboard alignment, at least one tank being situated in a wing of the aircraft,
    at least one pump for transferring fuel between the tanks, and
    a fuel management system for controlling and monitoring the transfer of fuel between tanks, said system comprising:
        means for receiving a first input signal that the aircraft has left the ground;
        means for receiving a second input signal that the aircraft is approaching its destination,
        means for initiating the transfer of the fuel from a relatively inboard tank location to a relatively outboard tank location in response to the first input signal, and
    means for initiating the transfer of the fuel from a relatively outboard tank location to a relatively inboard tank location in response to the second input signal,
    wherein the fuel management system is programmed to respond to a second input signal that the aircraft has descended to a certain altitude on its approach to land.

3. A fuel transfer apparatus for an aircraft comprising:
    at least two fuel tanks arranged in an inboard to outboard alignment, at least one tank being situated in a wing of the aircraft,
    at least one pump for transferring fuel between the tanks, and
    a fuel management system for controlling and monitoring the transfer of fuel between tanks said system comprising:
        means for receiving a first input signal that the aircraft has left the ground;
        means for receiving a second input signal that the aircraft is approaching its destination,
        means for initiating the transfer of the fuel from a relatively inboard tank location to a relatively outboard tank location in response to the first input signal, and
    means for initiating the transfer of the fuel from a relatively outboard tank location to a relatively inboard tank location in response to the second input signal,
    wherein said second input signal is relayed between the flight control program and the fuel management system when a certain point on a pre-programmed flight path has been reached.

4. A fuel transfer apparatus for an aircraft comprising:
    at least two fuel tanks arranged in an inboard to outboard alignment, at least one tank being situated in a wing of the aircraft,
    at least one pump for transferring fuel between the tanks, and
    a fuel management system for controlling and monitoring the transfer of fuel between tanks, said system comprising:
        means for receiving a first input signal that the aircraft has left the ground;
        means for receiving a second input signal that the aircraft is approaching its destination,
        means for initiating the transfer of the fuel from a relatively inboard tank location to a relatively outboard tank location in response to the first input signal, and
    means for initiating the transfer of the fuel from a relatively outboard tank location to a relatively inboard tank location in response to the second input signal,
    wherein the fuel management system will have manual override facility to enable flight crew to adapt to unforeseen circumstances.

* * * * *